US008665105B2

(12) United States Patent
Kirkup et al.

(10) Patent No.: US 8,665,105 B2
(45) Date of Patent: *Mar. 4, 2014

(54) SYSTEM AND METHOD FOR PROVIDING IMPROVED DETECTION OF USER INACTION

(75) Inventors: Michael Kirkup, Waterloo (CA); Sean Wilson, Kitchener (CA); Christopher Pattenden, Waterloo (CA); Vahid Moosavi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 27 days.

This patent is subject to a terminal disclaimer.

(21) Appl. No.: 13/366,929

(22) Filed: Feb. 6, 2012

(65) Prior Publication Data

US 2012/0133493 A1      May 31, 2012

Related U.S. Application Data

(63) Continuation of application No. 11/674,306, filed on Feb. 13, 2007, now Pat. No. 8,111,144.

(51) Int. Cl.
*G08C 19/12* (2006.01)

(52) U.S. Cl.
USPC .............. 340/686.6; 340/13.25; 340/539.23; 340/13.26; 455/411; 455/41.1

(58) Field of Classification Search
USPC ............ 340/572.1, 686.6, 539.3, 5.31, 13.25, 340/13.26, 13.2, 13.21; 455/550.1, 575.6, 455/41.2, 90.3, 575.2, 344, 569.1, 552.1, 455/575.1, 557
See application file for complete search history.

(56) References Cited

U.S. PATENT DOCUMENTS

| | | | |
|---|---|---|---|
| 5,455,466 | A | 10/1995 | Parks et al. |
| 6,102,266 | A | 8/2000 | Chacon et al. |
| 6,115,620 | A | 9/2000 | Colonna et al. |
| D457,308 | S | 5/2002 | Infanti |
| 6,405,910 | B1 | 6/2002 | Infanti et al. |
| 6,674,358 | B1 | 1/2004 | Tinsley |
| D490,119 | S | 5/2004 | Griffin et al. |
| 6,836,212 | B2 | 12/2004 | Sawinski |
| 6,905,051 | B2 | 6/2005 | Chee |

(Continued)

FOREIGN PATENT DOCUMENTS

| | | |
|---|---|---|
| EP | 1411709 | 4/2004 |
| EP | 1662358 | 5/2006 |
| WO | 2006103146 | 10/2006 |

OTHER PUBLICATIONS

Near Field Communication Interface and Protocol—2 (NFCIP-2) Standard ECMA-352, ECMA International, Dec. 2003, 1st Edition; www.ecma-international.org.

(Continued)

*Primary Examiner* — Mohammad Ghayour
*Assistant Examiner* — Nay Tun
(74) *Attorney, Agent, or Firm* — Allen, Dyer, Doppelt, Milbrath & Gilchrist, P.A.

(57) ABSTRACT

A mobile computing device may include an interface device, a near field communication (NFC) device, and a processor coupled with the interface device and the NFC device. The processor may be capable of detecting proximity of an encasement based upon the NFC device, and changing an operational mode of the interface device based upon detecting the proximity of the encasement.

39 Claims, 4 Drawing Sheets

(56) References Cited

U.S. PATENT DOCUMENTS

| | | | |
|---|---|---|---|
| 6,983,169 B2 * | 1/2006 | Vogel et al. | 455/550.1 |
| 7,536,562 B2 | 5/2009 | Little et al. | |
| 2004/0180649 A1 | 9/2004 | Vogel et al. | |
| 2005/0049760 A1 | 3/2005 | Narayanaswami | |
| 2005/0266894 A9 | 12/2005 | Rankin | |
| 2005/0282576 A1 | 12/2005 | Delker et al. | |
| 2006/0022822 A1 | 2/2006 | Wong et al. | |
| 2006/0073819 A1 | 4/2006 | Lowles | |
| 2006/0245402 A1 * | 11/2006 | Fujii et al. | 370/338 |
| 2008/0073192 A1 * | 3/2008 | Lee | 200/333 |
| 2008/0194200 A1 * | 8/2008 | Keen et al. | 455/41.1 |
| 2008/0246667 A1 * | 10/2008 | Symons | 343/702 |
| 2009/0228720 A1 | 9/2009 | Little et al. | |
| 2011/0239292 A1 | 9/2011 | Little et al. | |
| 2012/0017272 A1 | 1/2012 | Little et al. | |

OTHER PUBLICATIONS

Near Field Communication Interface and Protocol (NFCIP-1) Standard ECMA-340, ECMA International, Dec. 2004, 2nd Edition; www.ecma-international.org.

Near Field Communication, White Paper, ECMA International, ECMA/TC32-TG19/2004/1.

Rukzio, Enrico Physical Mobile InteracTions: Mobile DeVices as Pervasive mediators for Interactions with the Real World, 12/19/20069, http://edoc.ub.ui-muinchen.de/archive/ooоо6494/01/rukzio_enrico.pdf.

Finkenzeller: RFID Handbook : Fundamentals and Applications in Contactless Smart Cards and Identification:, pp. 42-44, 2003.

* cited by examiner

SYSTEM AND METHOD FOR PROVIDING IMPROVED DETECTION OF USER INACTION

RELATED APPLICATIONS

This application is a continuation of application Ser. No. 11/674,306 filed Feb. 13, 2007, now U.S. Pat. No. 8,111,144 the entire disclosure of which is hereby incorporated herein by reference.

FIELD

The present application relates generally to portable computing devices and, more specifically, to a system and a method for providing improved detection of a suspension of user activity on the portable computing device.

BACKGROUND

As computing devices continue to become more ubiquitous, they are also becoming smaller. In many cases, handheld computing devices execute telephony applications, data communication applications, a calendar application and a contact management application. As such, it is desirable to have the handheld computing devices available quickly. To this end, rather than keep a handheld computing device in a purse or briefcase, many people opt for a holster to allow the handheld computing device to be attached to a belt around the waist of the user or attached to the outside of a bag.

Typical components of a handheld computing device include an output device, such as a display screen, an input device, such as a keypad, and a battery, to allow operation away from fixed power sources. It has been recognized that providing power to the display screen is one of the activities that drains the battery most quickly. As such, many handheld computing devices have been designed to sense the suspension of user activity on the handheld computing device. For example, a handheld computing device may sense the presence of a corresponding holster and, responsive to sensing the close proximity of the holster, enter into a user-inactive mode. Entering the user-inactive mode may be defined to include disabling the display screen. In one example, the holster is provided with a magnet. The corresponding handheld computing device is provided with a Hall Effect sensor in a position that corresponds, when the handheld computing device is in the holster, to the location of the magnet in the holster. When the handheld computing device is placed in the holster, the magnet is sensed by the Hall Effect sensor and the handheld computing device enters into the user-inactive mode.

As well as disabling the output device responsive to sensing close proximity of the holster, entering into the user-inactive mode may also involve disabling the input device, as it is unlikely that the user will be providing input while the handheld computing device is in the holster. However, often presses of keys on the keypad are recorded as the handheld computing device is going into, and coming out of, the holster. That is, unintended input is received by the handheld computing device while the handheld computing device is too far from the magnet to sense the magnet and, responsively, enter into the user-inactive mode.

Clearly it would be advantageous to enter into the user-inactive mode, and, thus, disable input devices, before unintentional input occurs. Furthermore, additional power savings may be realized by disabling output devices earlier than is done in present practice.

BRIEF DESCRIPTION OF THE DRAWINGS

Reference will now be made to the drawings, which show by way of example, embodiments, and in which.

DETAILED DESCRIPTION OF THE EMBODIMENTS

Figure 1:
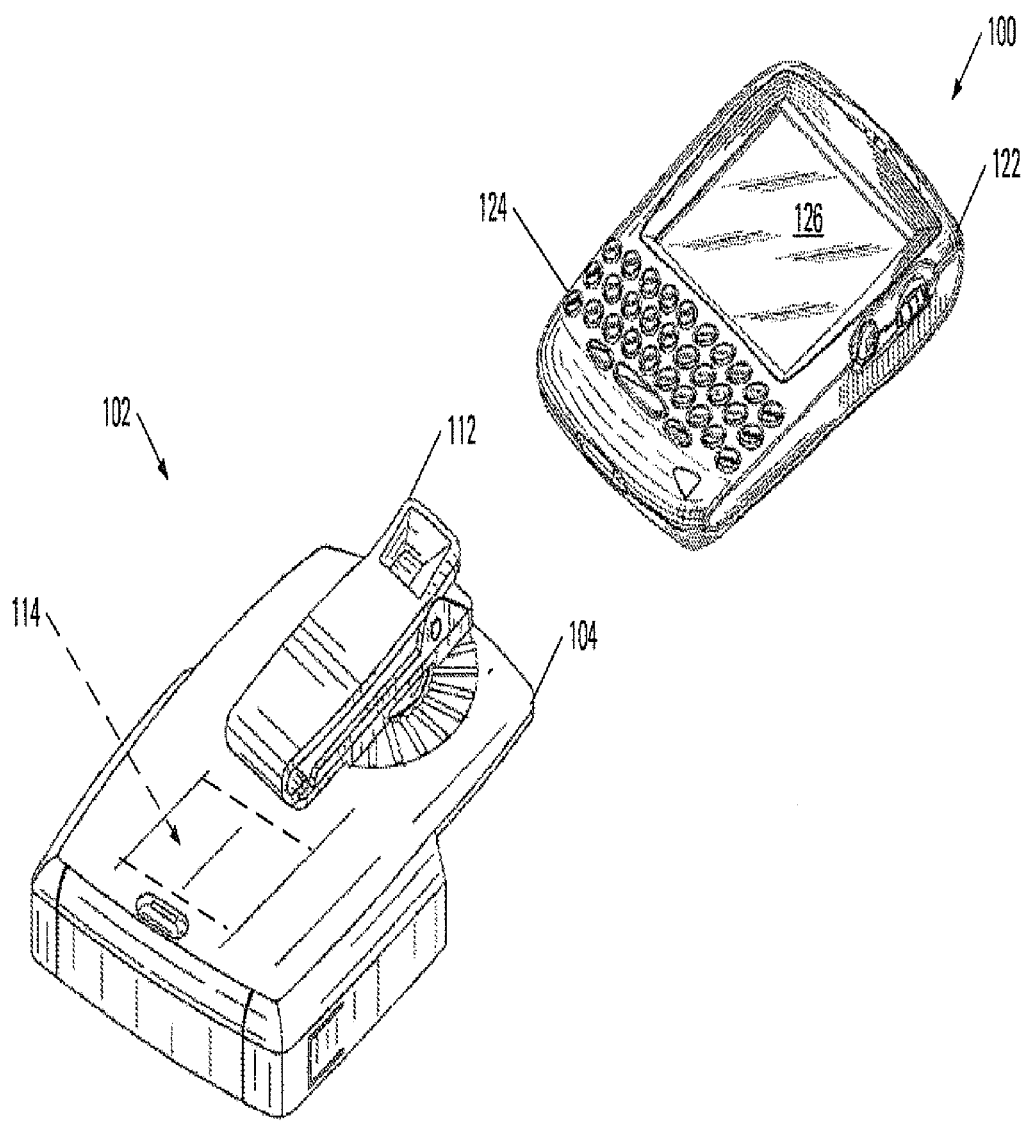
FIG. 1 illustrates a mobile wireless communication device and a corresponding holster.

A mobile device, through the use of a Near Field Communications subsystem, may trigger entry into a state of user inaction. Exemplary of a such as state is holster-proximity, that is, the mobile device being near to (including in) a holster is correlated with an expectation that the user will not be using the mobile device. Holster-proximity information may be used by the mobile device to enter a user-inactive mode wherein user interface components, such as input devices and output devices, are disabled. In particular, affirmative holster-proximity information may be used by the mobile device to enter the user-inactive mode wherein the keyboard is disabled, that is, wherein presses on keys in the keyboard are prevented from being recorded. Such disabling may be considered of particular importance when the mobile device is going into and coming out of the holster.

In accordance with an aspect of the present application, there is provided a method of controlling an operation mode of a mobile computing device. The method includes detecting proximity of a holster to the mobile computing device, wherein the detecting the proximity includes: generating an electro-magnetic carrier field; and sensing modulation of the electro-magnetic carrier field by a component of said holster. The method also includes, responsive to the detecting, entering into a user-inactive mode. Additionally, a mobile computing device is provided for carrying out this method.

In accordance with another aspect of the present application, there is provided a method of handling a report related to proximity of a device to a holster for housing the device. The method includes determining that a report has been received, determining whether the report indicates that proximity of the holster is sensed and, responsive to determining that the report indicates that proximity of the holster is sensed, entering into a user-inactive mode.

In accordance with a further aspect of the present application, there is provided a method of handling a report related to proximity of a device to a holster for housing the device. The method including determining that a report has been received, determining whether the report indicates that previously sensed proximity of the holster has ceased and, responsive to determining that the report indicates that previously sensed proximity of the holster has ceased, entering into a user-active mode.

Other aspects and features of the present application will become apparent to those of ordinary skill in the art upon review of the following description of specific embodiments of the application in conjunction with the accompanying figures.

The "Near Field Communications Interface and Protocol", or "NFCIP-1" or "the NFC protocol", is a recently developed communication protocol that allows for communication between an Initiator device and a Target device, when the Initiator device and the Target device are brought close together. Detailed information about NFCIP-1 is available in a published standard called ECMA-340, which is available from Ecma International at www.ecma-international.org. Central to the operation of the NFC protocol is magnetic field induction.

The NFC protocol operates within the globally available and unregulated radio frequency band of 13.56 MHz and has a working distance of up to 20 centimeters. Three data rates are available: 106 kilobits per second (kbit/s); 212 kbit/s; and 424 kbit/s. Two modes of communication are currently available: a Passive communication mode; and an Active communication mode. In the Passive communication mode, the Initiator device provides an electro-magnetic carrier field and the Target device answers the initiator device by modulating the carrier field. In the Passive communication mode, the Target device may draw operating power from the carrier field provided by the Initiator device. Advantageously, only the Initiator device is required to have a power supply.

In the Active communication mode, both the Initiator device and the Target device generate their own electro-magnetic field. The Initiator device starts the NFCIP-1 communication. The Target device responds to a command received from the Initiator device in the Active communication mode by modulating the electro-magnetic field generated by the Target device. Typically, in the active communication mode, both devices need to have a power supply.

Notably, in the Active communication mode, both devices can act as either Initiator or Target, while this is not the case in the Passive communication mode, wherein the device without the ability to create an electro-magnetic carrier field can't be an Initiator device.

According to NFCIP-1, responsive to sensing modulation of the Initiator electro-magnetic carrier field by the Target device, the Initiator device performs an initial collision avoidance sequence by transmitting an ATR_REQ (attribute request) command to the Target device. Responsive to receiving the ATR_REQ (attribute request) command, the Target device transmits a response called ATR_RES (attribute response).

FIG. 1 illustrates a mobile wireless communication device 100 and a corresponding holster 102. The mobile device 100 has a housing 122, an input device (a keyboard 124) and an output device (a display screen 126), which is preferably a full graphic, or full color, Liquid Crystal Display (LCD). Other types of output devices may alternatively be utilized. The housing 122 may be elongated vertically, or may take on other sizes and shapes (including clamshell housing structures). The keyboard may include a mode selection key, or other hardware or software, for switching between text entry and telephony entry.

The holster 102 includes a belt clip 112 that is rotatably attached to a body 104. Indicated generally by reference numeral 114, a battery-less passive NFC card is embedded into the body 104 of the holster 102. The NFC card 114 includes an NFC chip, which may be a memory-based chip or a processor-based chip, and an NFC antenna that is tuned for 13.56 MHz. The NFC chip may be a memory-based chip or a processor-based chip and is adapted to carry out the actions necessary for communication using the NFC protocol, including modulation, demodulation, encoding and decoding. Suitable NFC chips for this application include chips using MIFARE® technology from Koninklijke Philips Electronics N.V. of the Netherlands and chips using FeliCa™ technology from Sony Corporation of Japan. The NFC card 114, including both the NFC chip and the antenna, can be embedded in the body 104 of the holster 102.

In general, a holster is a specialized article of clothing worn to hold a device, such as a handgun or other defensive weapon, cellular telephone, hand tool, or other small object about the person, most commonly in a location where it can be easily withdrawn for immediate use. As used herein, the term "holster" is intended to cover encasements designed for use with the mobile device 100. Furthermore, placement of the mobile device 100 in the holster 102 is expected to serve to indicate suspension of user interaction with the mobile device 100. Accordingly, a holster fitting such a definition need not be equipped with a belt clip or have any relation to a belt. Indeed, a holster could be a specifically sized and shaped pocket in a purse or briefcase.

Figure 2:
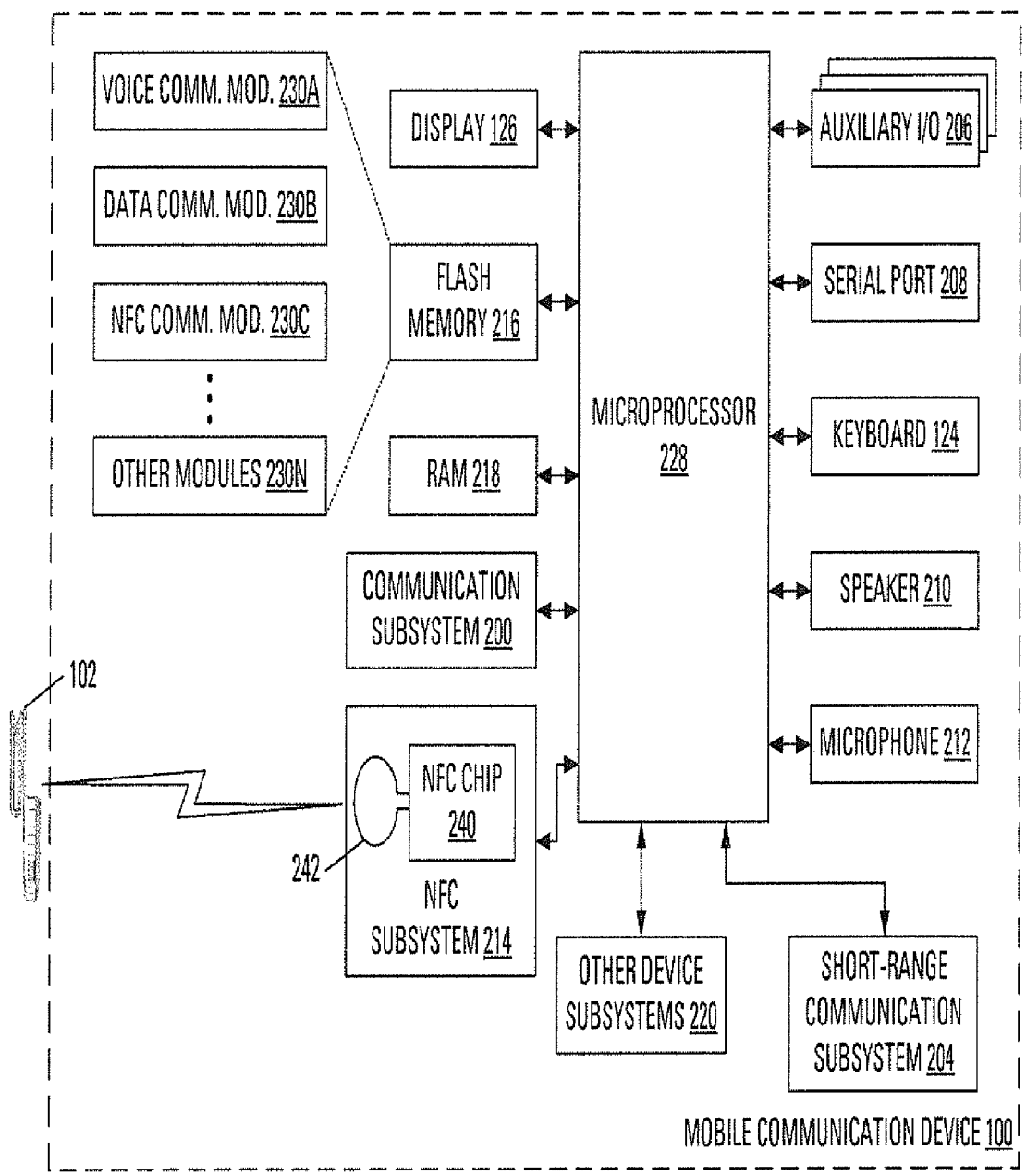
FIG. 2 illustrates an exemplary hardware configuration for the mobile device of FIG. 1.

A processing device (a microprocessor 228) is shown schematically in FIG. 2 as coupled between the keyboard 124 and the display screen 126. The microprocessor 228 controls the operation of the display screen 126, as well as the overall operation of the mobile device 100, in part, responsive to actuation of keys on the keyboard 124 by a user.

In addition to the microprocessor 228, other parts of the mobile device 100 are shown schematically in FIG. 2. These include: a communications subsystem 200; a short-range communications subsystem 204; the keyboard 124 and the display screen 126, along with other input/output devices including a set of auxiliary I/O devices 206, a serial port 208, a speaker 210 and a microphone 212; as well as memory devices including a flash memory 216 and a Random Access Memory (RAM) 218; and various other device subsystems 220. The mobile device 100 is preferably a two-way radio frequency (RF) communication device having voice and data communication capabilities. In addition, the mobile device 100 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile device 100. A predetermined set of software applications that control basic device operations, such as a voice communications module 230A and a data communications module 230B, may be installed on the mobile device 100 during manufacture. A NFC communications/mode control module 230C may also be installed on the mobile device 100 during manufacture, to implement aspects of the present application. As well, additional software modules, illustrated as an other software module 230N, which may be, for instance, a personal information manager (PIM) application, may be installed during manufacture.

The PIM application is preferably capable of organizing and managing data items, such as e-mail messages, calendar events, voice mail messages, appointments and task items. The PIM application is also preferably capable of sending and receiving data items via a wireless carrier network. Preferably, the data items managed by the PIM application are seamlessly integrated, synchronized and updated via the wireless carrier network with the device user's corresponding data items stored or associated with a host computer system.

The NFC communications module 230C allows the microprocessor 228 to control an NFC subsystem 214 for communication with the holster NFC card 114. The NFC subsystem 214 includes an NFC chip 240 and an antenna 242 that is tuned for 13.56 MHz, as discussed with reference to the antenna in the NFC card 114 of the holster 102. The NFC chip may, for example, be a PN531 Microcontroller-based Transmission module from the Philips Semiconductor branch of Koninklijke Philips Electronics N.V.

In the case wherein the NFC chip 240 is the PN531 module, the NFC chip 240 includes analog circuitry, a contactless Universal Asynchronous Receiver Transmitter (UART), a core and set of host interfaces. The analog circuitry includes an output driver, an integrated demodulator, a bit decoder, a mode-detector and an RF-level detector. The Contactless UART includes elements for data processing, Cyclical Redundancy Checking, parity generation, framing generation and check bit coding and decoding. The core includes an 80c51 microcontroller, 32 kbyte of ROM and 1 kbyte of RAM. The set of host interfaces, for interfacing with the microprocessor 228, includes interfaces according to such known standards as I2C, serial UART, SPI and USB.

Communication functions, including data and voice communications, are performed through the communication subsystem 200 and, possibly, through the short-range communications subsystem 204. The communication subsystem 200 includes a receiver, a transmitter, one or more antennas and a processing module (none shown). The specific design and implementation of the communication subsystem 200 is dependent upon the communication network in which the mobile device 100 is intended to operate. For example, the communication subsystem 200 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

In a data communication mode, a received signal, such as a text message or web page download, is processed by the communication subsystem 200 and is input to the microprocessor 228. The received signal is then further processed by the microprocessor 228 for output to the display screen 126, or alternatively to some auxiliary I/O devices 206. A device user may also compose data items, such as e-mail messages, using the keyboard 124 and/or some other auxiliary I/O device 206, such as a touchpad, a rocker switch, a thumbwheel, or some other type of input device. The composed data items may then be transmitted over the wireless carrier network 110 via the communication subsystem 200.

In a voice communication mode, overall operation of the device is substantially similar to the data communication mode, except that received signals are output to a speaker 210, and signals for transmission are generated by a microphone 212. Alternative voice or audio I/O subsystems, such as a voice message recording subsystem, may also be implemented on the device 100. In addition, the display screen 126 may also be utilized in voice communication mode, for example, to display the identity of a calling party, the duration of a voice call, or other voice call related information.

The short-range communications subsystem 204 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, the mobile device 100, through the use of the NFC subsystem 214, may trigger entry into a user-inactive mode. In particular, affirmative holster-proximity information, i.e., whether the mobile device 100 is near to (including in) the holster 102 may trigger entry into a user-inactive mode. As a consequence of entry into the user-inactive mode the mobile device 100 may disable user interface components such as input devices and output devices. In particular, the entry into the user-inactive mode may involve disabling the keyboard 124, that is, preventing presses on keys in the keyboard 124 from being recorded. Such disabling may be considered of particular importance when the mobile device 100 is going into and coming out of the holster 102.

The mobile device 100, with the NFC subsystem 214, may be adapted to operate as an NFC Initiator device in a communication session with the holster NFC card 114 operating as an NFC Target device. In the context of the NFCIP, the mobile device 100 acts as an NFC Reader/Writer while the holster NFC card 114 is adapted to respond communication from the mobile device 100 by using Load Modulation.

Figure 3:
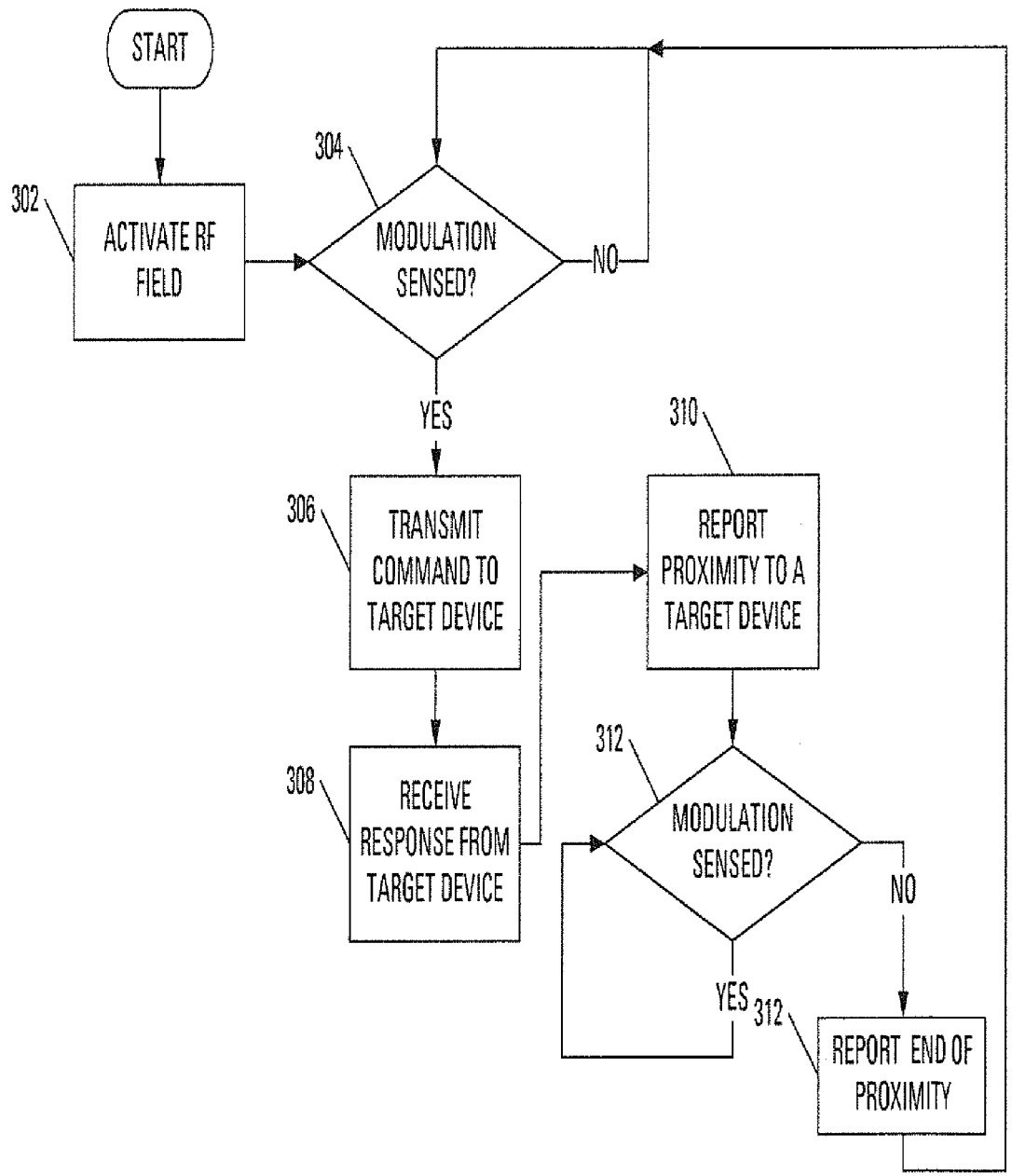
FIG. 3 illustrates steps of an exemplary method of sensing proximity of the holster to the mobile computing device of FIG. 1, according to an embodiment.

In operation, the NFC subsystem 214 of the mobile device 100 and the holster NFC card 114 are arranged for communication in the Passive NFC communication mode. In view of FIG. 3, the NFC subsystem 214 initially generates (step 302) an initiator electro-magnetic carrier field. The NFC subsystem 214 then probes the field for Target devices, that is, the NFC subsystem 214 determines (step 304) whether modulation of the initiator electro-magnetic carrier field has been sensed. Where the NFC subsystem 214 determines (step 304) that no modulation of the initiator electro-magnetic carrier field has been sensed, the probing (step 304) of the field for Target devices continues.

Where the NFC subsystem 214 determines (step 304) that modulation of the initiator electro-magnetic carrier field has been sensed, the NFC subsystem 214 transmits (step 306) a command to the device that is modulating the initiator electro-magnetic carrier field, i.e., a Target device, more particularly, the holster NFC card 114. Responsive to receiving the command, the holster NFC card 114, while drawing operating power from the initiator electro-magnetic carrier field provided by the NFC subsystem 214, transmits a response. The NFC subsystem 214 receives (step 308) the response and, based on the receiving, reports (step 310) to the microprocessor 228 that proximity of the holster 102 has been sensed. The NFC subsystem 214 then monitors (step 312) the status of the modulation of the initiator electro-magnetic carrier field. If the modulation continues to be sensed, then the monitoring (step 312) also continues. If, as is expected when the mobile device 100 is removed from the holster 102, the NFC subsystem 214 ceases to sense modulation (step 312), then the NFC subsystem 214 reports (step 314) to the microprocessor 228 that sensing the proximity of the holster 102 has ceased. The NFC subsystem 214 then returns to probing the field for Target devices (step 304).

While typical Initiator devices activate an RF field in response to an application request, i.e., the field is not "always active", it is proposed herein that the RF field of the mobile device 100 may be required to be always active for accurate and timely detection of proximity to the holster 102. Accordingly, an NFC application automatically starts as the mobile device 100 is powered on and the NFC application enables the initiator electro-magnetic carrier field (step 302). However, to reduce power consumption, it has been contemplated that, perhaps when the mobile device 100 is placed into a "standby" mode, the initiator electro-magnetic carrier field may be deactivated. In such a "standby" mode, it may be arranged that an initial keystroke (or other user interaction with a physical user input interface) be ignored and, therefore, the accidental key press, which may occur when the device is set into the holster 102, is ignored and the need for proximity detection is reduced.

Figure 4:
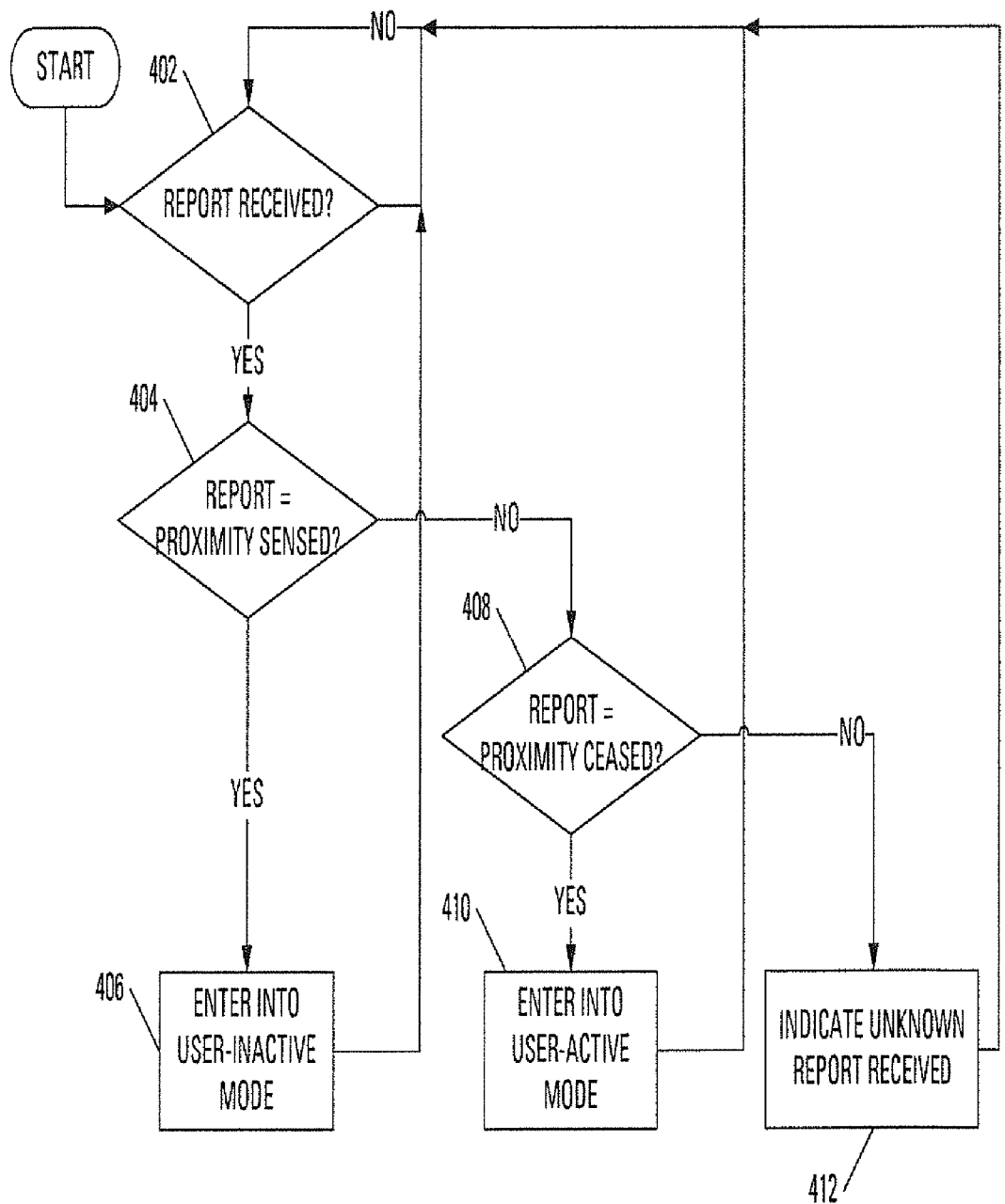
FIG. 4 illustrates steps of an exemplary method of controlling a user interface component of a mobile computing device based on received proximity information according to an embodiment.

The microprocessor 228, responsive to determining (step 402, FIG. 4) that a report has been received from the NFC subsystem 214, determines (step 404) whether the report is a "proximity sensed" report. If the microprocessor 228 determines that the report is a "proximity sensed" report, the microprocessor 228 enters (step 406) into the user-inactive mode. After entering (step 406) the user-inactive mode, the microprocessor 228 returns to monitoring (step 402) for receipt of further reports.

Entry into the user-inactive mode may involve several activities, where some of the activities are related to user interface components are some are not. As discussed above, it would be advantageous to disable input devices upon entry into user-inactive mode, before unintentional input occurs. Accordingly, entry into user-inactive mode may involve disabling the keyboard 124. Where a device receives user input through a touch screen, a track wheel or a track ball, any or all of these user input devices may also be disabled as part of entry into user-inactive mode.

Entry into the user-inactive mode may also involve disabling a user interface component designed for output to the user. Historically, devices have disabled related display screens when entirely received within a corresponding holster. Now, to achieve power savings beyond those realized by disabling the display screen 126 when the mobile device 100 is entirely received within the holster 102, entry into the user-inactive mode responsive to determining (step 404) that the "proximity sensed" report has been received from the NFC subsystem 214, may, for example, involve disabling the display screen 126.

Additionally, entry into the user-inactive mode may involve a change of a notification profile. For instance, the mobile device 100 may be configured, by default, say, or by the user, to select a manner in which to notify the user of an incoming call, an incoming e-mail message, an incoming SMS or a scheduled event, dependent upon the mode of the mobile device 100 when the call is received. That is, the mobile device 100 may be configured to provide an audible notification, e.g., a ringing sound, when the mobile device is in user-inactive mode. Further, the mobile device 100 may be configured to provide a physical notification, e.g., a vibration alert, when the mobile device is in user-active mode.

Even further, there may be operating system maintenance activities that are configured to only occur when the mobile device 100 is in user-inactive mode, e.g. so-called "garbage collection".

If the microprocessor 228 determines (step 404) that the report is not a "proximity sensed" report, the microprocessor 228 determines (step 408) whether the report is a "proximity ceased" report. If the microprocessor 228 determines that the report is a "proximity ceased" report, the microprocessor 228 enters (step 410) the user-active mode. Accordingly, as part of entering (step 410) the user-active mode, the microprocessor 228 may, for example, re-enable the keyboard 124. After entering (step 410) the user-active mode, the microprocessor 228 returns to monitoring (step 402) for receipt of further reports.

If the microprocessor 228 determines (step 404) that the report is not a "proximity ceased" report, the microprocessor 228 indicates (step 412) that a report of an unknown type has been received. Such indication may involve writing to a log or generating a dialog for showing on the display screen 126.

Upon reading the above, a reader may consider that the combination of the NFC subsystem 214 and the holster NFC card 114 may be considered a replacement for previous proximity sensing apparatus, such as the Hall Effect sensor and magnet combination. However, the applicants consider that multiple proximity sensing apparatus may be complimentary. For example, once the mobile device 100 has been received in the holster 102 and has entered into user-inactive mode, it may be considered inefficient use of battery power to continue to monitor for presence of the holster 102. Instead, the relatively power conservative Hall Effect sensor and magnet combination may be used to confirm The above-described embodiments of the present application are intended to be examples only. Alterations, modifications and variations may be effected to the particular embodiments by those skilled in the art without departing from the scope of the application, which is defined by the claims appended hereto.

What is claimed is:

1. A mobile computing device including:
    an interface device;
    a first near field communication (NFC) device; and
    a processor coupled with the interface device and the first NFC device, the processor being configured to
        detect proximity of an encasement including a second NFC device based upon the first NFC device when the mobile computing device is both in and either going into or coming out of the encasement, and
        responsive to the proximity detection, change an operational mode of the interface device.

2. The mobile computing device of claim 1 wherein the interface device comprises a keyboard.

3. The mobile computing device of claim 1 wherein the interface device comprises a touch screen.

4. The mobile computing device of claim 1 wherein the interface device comprises a track ball.

5. The mobile computing device of claim 1 wherein the interface device comprises a display.

6. The mobile computing device of claim 1 further including a wireless communications device coupled with the processor; and wherein the processor is further configured to change a notification profile associated with the wireless communications device based upon detecting the proximity of the encasement.

7. The mobile computing device of claim 1 wherein the processor is further configured to enable the interface device based upon a failure of the first NFC device to detect proximity of the encasement.

8. The mobile computing device of claim 1 wherein the processor is further configured to transmit a command to the encasement via the first NFC device.

9. The mobile computing device of claim 8 wherein the processor is further configured to receive a response from the second NFC device via the first NFC device.

10. The mobile computing device of claim 1 wherein the encasement comprises a holster.

11. The mobile computing device of claim 1 wherein the first NFC device comprises an active NFC device.

12. A method performed by a mobile computing device including an interface device and a first near field communication (NFC) device, the method including:
   detecting proximity of an encasement including a second NFC device using the first NFC device when the mobile computing device is both in and either going into or coming out of the encasement; and
   responsive to the proximity detection, changing an operational mode of the interface device.

13. The method of claim 12 wherein the interface device comprises a keyboard.

14. The method of claim 12 wherein the interface device comprises a touch screen.

15. The method of claim 12 wherein the interface device comprises a display.

16. The method of claim 12 wherein the mobile computing device further includes a wireless communications device; and further including changing a notification profile associated with the wireless communications device based upon detecting the proximity of the encasement.

17. The method of claim 12 wherein the encasement comprises a holster.

18. A non-transitory computer-readable medium for a mobile computing device including an interface device and a first near field communication (NFC) device, the non-transitory computer-readable medium having computer-executable instructions for causing the mobile computing device to perform steps including:
   detecting proximity of an encasement including a second NFC device using the first NFC device when the mobile computing device is both in and either going into or coming out of the encasement; and
   responsive to the proximity detection, changing an operational mode of the interface device.

19. The non-transitory computer-readable medium of claim 18 wherein the interface device comprises a keyboard.

20. The non-transitory computer-readable medium of claim 18 wherein the interface device comprises a touch screen.

21. The non-transitory computer-readable medium of claim 18 wherein the interface device comprises a display.

22. The non-transitory computer-readable medium of claim 18 wherein the mobile computing device further includes a wireless communications device; and further having computer-executable instructions for causing the mobile computing device to change a notification profile associated with the wireless communications device based upon detecting the proximity of the encasement.

23. The non-transitory computer-readable medium of claim 18 wherein the encasement comprises a holster.

24. An electronics system including:
   a mobile computing device including:
      an interface device,
      a first near field communication (NFC) device, and
      a processor coupled with the interface device and the first NFC device; and
   an encasement including a second NFC device;
   wherein the processor is configured to
      detect proximity of the encasement based upon NFC communication between the first NFC device and the second NFC device when the mobile computing device is both in and either going into or coming out of the encasement, and
      responsive to the proximity detection, change an operational mode of the interface device.

25. The electronics system of claim 24 wherein the interface device comprises a keyboard.

26. The electronics system of claim 24 wherein the interface device comprises a touch screen.

27. The electronics system of claim 24 wherein the interface device comprises a display.

28. The electronics system of claim 24 wherein the mobile computing device further includes a wireless communications device coupled with the processor; and
   wherein the processor is further configured to change a notification profile associated with the wireless communications device based upon detecting the proximity of the encasement.

29. The electronics system of claim 24 wherein the encasement comprises a holster.

30. The electronics system of claim 24 further including at least one clip carried by the encasement.

31. The electronics system of claim 24 wherein the second NFC device comprises a passive NFC device.

32. The electronics system of claim 24 wherein the first NFC device comprises an active NFC device.

33. An apparatus for use with a mobile computing device including an interface device and a first near field communication (NFC) device, the apparatus including:
   an encasement for use with the mobile computing device; and
   a second NFC device carried by the encasement and configured to communicate with the first NFC device of the mobile computing device via NFC communication to cause said mobile computing device to change an operational mode of the interface device responsive to the mobile computing device being both in and either going into or coming out of the encasement.

34. The apparatus of claim 33 wherein the encasement comprises a holster.

35. The apparatus of claim 33 further including at least one clip carried by the encasement.

36. The apparatus of claim 33 wherein the second NFC device includes a passive NFC device.

37. The apparatus of claim 33 wherein the first NFC device includes an active NFC device.

38. The apparatus of claim 33 wherein the second NFC device comprises an NFC chip.

39. The apparatus of claim 33 wherein the second NFC device comprises an NFC antenna.

* * * * *